United States Patent
Kochberger (10) Patent No.: US 6,626,225 B1
(45) Date of Patent: Sep. 30, 2003

(54) COATING PRESS

(75) Inventor: Andreas Kochberger, Wang (AT)

(73) Assignee: Renate Kochberger, Wang (AT)

( * ) Notice: Subject to any disclaimer, the term of this patent is extended or adjusted under 35 U.S.C. 154(b) by 191 days.

(21) Appl. No.: 09/703,861

(22) Filed: Nov. 1, 2000

(51) Int. Cl.$^7$ ............................................... B30B 15/00
(52) U.S. Cl. ......................... 156/581; 269/21; 269/266
(58) Field of Search ................... 156/580, 581, 156/583.1; 269/20, 21, 266

(56) References Cited

U.S. PATENT DOCUMENTS

| | | | |
|---|---|---|---|
| 4,640,501 A | 2/1987 | Poland | |
| 5,026,033 A | 6/1991 | Roxy | |
| 5,562,276 A | 10/1996 | Blick | |
| 5,722,646 A | * 3/1998 | Soderberg et al. | 269/20 |
| 6,089,801 A | * 7/2000 | Hardesty | 409/225 |
| 6,250,619 B1 | * 6/2001 | Cook et al. | 269/20 |
| 6,286,822 B1 | * 9/2001 | Blick | 269/21 |
| 6,328,507 B1 | * 12/2001 | Shoda | 409/220 |

FOREIGN PATENT DOCUMENTS

| | | |
|---|---|---|
| DE | 90 12 791 U | 11/1990 |
| DE | 295 00 248 U | 3/1995 |
| DE | 196 11 754 A | 10/1997 |
| EP | 0 507 033 A | 10/1992 |

* cited by examiner

Primary Examiner—James Sells
(74) Attorney, Agent, or Firm—Adams Evans P.A.

(57) ABSTRACT

Press table insert for a coating press for multi-side film coating of form boards with a press table (1) which can be moved into the coating press, and which is equipped with numerous individual carriers (5) for taking up the workpieces (13) which are to be coated, whereby the individual carriers (5) can be moved horizontally on the press table (1) within their ranges of movement (10) for taking up the workpieces (13), whereby the height of each individual carrier (5) is shortened during the pressing process. A process for multi-side film coating of form boards is envisaged too. Thereby the film which is to be processed is first of all heated and then coated onto the boards by applying vacuum and pressure. The workpieces (13) which are to be coated are placed with mutual separation on the individual carriers (5) and thereafter the individual carriers (5) which are located in the peripheral regions of the workpieces (13) are shifted within their ranges of movement (10) such that the affected individual carriers (5) are set back with respect to the edges of the workpieces (13). After moving the press table into the press chamber, the distance between the workpieces and the press table support is reduced for the duration of the vacuum drawing period (see FIG. 1).

48 Claims, 6 Drawing Sheets

COATING PRESS

TECHNICAL FIELD AND BACKGROUND OF THE INVENTION

This invention concerns a press table insert for a coating press.

For coating form boards, in particular form boards with milled cuts used as front panels in furniture construction, with film on the surface as well as on the edges in a single pass process, press machines are used in which the workpiece is placed on a support whose circumference is slightly retracted with respect to the edge of the workpiece. This makes it possible for the film to nestle not only on the surface into the milled cuts, but also allows it, after applying increased or decreased pressure, to pull down at the edges and finish flush therewith.

Press machines are known for which the supporting body must be specially made for the particular workpiece. This is certainly a satisfactory solution for mass production with workpieces which have constant dimensions. But if the dimensions of the workpiece vary frequently, in particular for special production, very many different supports must be quickly available in this case. This entails enormous work effort and costs.

Press machines are also known which use modular components to produce the required supports.

For example, the document DE 295 00 248 describes a modular components system for plate/board workpieces in which support plugs are inserted into holes according to a given pattern for supporting the workpiece. However, the pattern must be determined and implemented separately for each kind of workpiece, and it can carry only one particular workpiece, like the solid supports. The support must be created new if it is necessary to quickly coat another different workpiece together with the main workpiece in each pressing cycle.

Thereby it makes no difference whether the second workpiece is smaller or larger than the first one, because the same support cannot be used for both workpieces in either case. If the second workpiece is too large, it cannot be supported securely, so that there is a danger that it will break when the applied pressure per unit area is too large. If the second workpiece is too small, the already set plugs prevent proper coating of the edges, because the film cannot be completely pulled down.

The document PCF/DE97/00544 shows a coating press in which the laying table has a table plate with raster breakouts in which movable carriers are inserted. These carriers can be moved out of the table plate to lift the workpiece off the table plate. Furthermore, sensors are provided which determine the size and position of the workpiece. The carriers are actuated via deflecting rockers to generate the support pattern. However, the workpiece is sensed row by row of the carriers before it can be moved up. This is a time-consuming process tending to slow-down production.

This device also requires a complicated expensive control mechanism, and the variability of the workpieces is still restricted by the rather large supporting plates resting on the carriers.

SUMMARY OF THE INVENTION

The purpose of this invention is to produce a press for film coating form boards on several sides, avoiding the disadvantages of the known solutions while providing supports for any workpiece quickly and cheaply.

This invention is also intended to provide a solution which can be retrofitted to machines which are workpiece movable through a certain horizontal range of displacement of the press table, and by reducing the height of each individual carrier during the pressing process.

The range of movement assigned to each individual carrier permits an arrangement of the carriers such that workpieces of any shape and size can be coated without first having to define a supporting pattern. It suffices to place the workpieces onto the carriers and then to adjust the positions of individual carriers on the outer edges of the workpieces. This can be done quickly and efficiently because it is not necessary to maintain any exact clearance dimension. The height of each individual carrier is also shortened during the pressing process to assist the latter. This is of advantage in particular because an initially higher carrier brings the workpiece closer to the heating device, so that the radiant heat pre-heats the parts which are to be film-coated, thus ensuring better edge and surface adhesion strength, because the film does not have to be heated as much since the workpiece is already hot. Furthermore, the film coating in the vacuum drawing work step is carried out without any problems while the workpieces are high. When pressure is applied in the next step, the lower height is more advantageous for preventing film problems in the corner regions, in particular wrinkles or tearing of the material. Therefore reduction of the height of the individual carriers during the pressing process is major step towards work process simplification.

In principle, every range of movement around every individual carrier can be made arbitrarily large. This solution can prove to be favorable in particular for making special workpieces as well as for special tasks. Some examples are glass frame pressing, frame pressing in general, film coating of round and polygonal pieces.

For producing standard parts as well as simple rectangular workpieces such as furniture fronts, it is of advantage to make the range of movement equal for all individual carriers. The mutual separations of adjacent ranges of movement can also be made equal. This defines a symmetrical pattern with uniform minimum and maximum mutual separation of the individual carriers. At any rate, it is necessary not to undershoot a minimum separation of adjacent ranges of movement, and this also defines a minimum separation of adjacent individual carriers. Such an arrangement soon leads to problems for coating the workpiece surfaces. This can be combated by providing a minimum separation.

This invention envisages that each individual carrier has the same length and consists of a shaft, a base and a covering layer resting on the base. The shaft and base are preferably made of rigid material, for example plastics such as polyamide or cellamide, or of aluminum, whereas the covering layer consists of elastic material to make possible shortening of the height of the individual carriers during the pressing process. The covering layer also avoids direct contact between the workpiece underside and the rigid material of the base which would not be optimum for taking up the high working pressures and could also damage the workpiece underside. Therefore a covering layer of elastic material is provided on the upper side of the base. After relaxing the working pressure again, this material returns to its original form each time and is therefore suitable for withstanding very many such elastic compression cycles under high pressure as well as high temperature. By virtue of providing this covering layer, it is now also possible to position the workpiece from below in an appropriate height when operating with vacuum drawing, in order to achieve film coating in the corner regions too without wrinkles. Film coating thereby takes place while the vacuum is building-up. The covering layer reaches its minimum height, in which state its compression is maximum, at the same time as the vacuum reaches its lowest pressure. When pressure is applied thereafter to continue the process, the distance between the workpiece and the supporting plate has become so small that even high pressure will no longer lead to bursting or tearing of the film.

Conventional devices always have to work with a minimum value in relation to the known film properties and thus operate with much greater danger of producing rejects either as film injury or improper film coating.

The covering layer is provided with a gripping surface to prevent slipping of the workpiece.

In a good design the shaft widens from the covering layer to the base and advantageously takes the form of a pyramidal or conical frustrum. This design ensures unproblematic separation of the film from the individual carriers after the pressing process.

According to a further design variant the shaft can also be made in two parts comprising a bottom part connecting to the base for guiding in the range of movement and a top part for taking up the covering layer. The top and bottom part are mutually offset and have no common vertical axis. The eccentric form makes it possible to support workpieces of any shape and dimensions, and the range of movement of the individual carriers becomes even greater.

It is of advantage for the base and the bottom part, as well as top part and the covering lays, to each have a common vertical axis, whereby the upper part carrying the covering layer at least partially projects horizontally beyond the bottom part in the transition region of the two parts. The larger design of the upper part makes possible better loading of the individual carriers.

According to a feature of this invention, the upper part of the shaft is tapered upwards and preferentially has the form of a pyramidal or conical frustrum. This makes it easier to separate the film from the individual carriers after film coating.

The bottom part of the shaft is preferentially cylindrical and chiefly corresponds to the height of the template whose height it exceeds only slightly.

According to a further feature of this invention the guiding plate is equipped with numerous guides which take up the bases of the individual carriers. These guides define the ranges of movement of the individual carriers.

By making the contact bearing area of the base greater than that of the individual carriers, according to a further design variant, unproblematic guiding is ensured without accidental break-out of an individual carrier.

According to a preferred design, the contact bearing area of the base is made rectangular, but variants with rounded corners or completely round designs can be used too.

Rounded elements are of significance in particular for the case in which the base can also be turned in the guide, to prevent binding of the individual carrier in the guides and thus to avoid temporary immobilization. Furthermore, a non-rounded base could come into an inclined orientation in which it could possibly no longer be able to reach the limits of the range of movement. This would imply a restriction of its adjustment possibilities. The rounded forms avoid such difficulties.

It is furthermore envisaged that a template with breakouts is placed above the guiding plate to define the ranges of movement of the individual carriers. At the same time this template also serves to avoid unintentional separation of the individual carriers out of their guides during adjustment, although variants are also conceivable in which one side of the base can already be within the range of movement in the state of maximum displacement. In such cases particular attention must be given to the material of the template so that it does nor become deformed or break under load, because it is not supported by the base. In general the template as well as the guiding plate and the spring plate are made of a porous pressed fibre material. According to a variant, these parts can preferentially be made or aluminum, stainless steel or plastic, if the required strength makes this necessary. In this variant numerous holes are provided for communicating the vacuum. Progressive coating of the workpieces would be hindered without these air passage holes. Porous materials do not require these holes, because of course they are sufficiently permeable for air to communicate the vacuum.

The guiding plate can also be made of wood.

A further design variant of this invention envisages that the base of the individual carrier is spring-mounted in the guide. According to a preferred design of this invention, this is achieved by providing a combination of a spring and a spring plate located in the guide, for taking up the base, whereby the spring is positioned centrally.

In this second variant the shaft extends upwards to a greater extent, for constructional reasons, producing the advantage that the workpieces are moved even closer to the heating device of the coating press during the coating process. The parts to be coated are pre-heated by the radiant heat emitted from the heating plate. The film positioned over the workpieces heats up more quickly, so that the processing time is shortened.

This constellation results in greater edge strength as well as greater surface strength, thus enhanced durability of the produced workpieces.

In this second design variant the spring changes its position after applying the vacuum, thus changing the distance between the workpiece and the press table support. Thereby the elastic covering layer of the individual carriers will hardly contribute, but it is still of advantage to prevent damage to the workpiece underside when applying pressure.

In a further design it is envisaged that several springs are located preferentially in the corner regions of the spring plate.

A further advantage of the spring-loaded design of the individual carriers results from the fact that each individual carrier can easily be separated from its guide by tilting. This makes it very easy to replace damaged carriers or to replace the carriers in general. Furthermore, a variant of the press table insert without using a template is envisaged.

For this purpose the guiding plate consists of a magnetizable material. The base of each individual carrier is thereby held magnetically in the guide and can easily be moved within its adjustment range.

According to a further design variant it is envisaged that the guiding plate is made of two layers comprising a top plate and a bottom plate whereby the guides are provided by the top plate. The top plate is firmly attached to the bottom plate, preferably by bonding.

Another feature of the invention is that the template is equipped with guide pins which pass through the top as well as though the bottom plate, whereby the guide pins pass through the upper plate in the region between the breakouts constituting the guides, and breakouts with clear width above the diameter of the guide pins are provided in the top and bottom plate to take up the guides. Each guide pin is equipped with a stop at its bottom end located in the region of the bottom plate, whereby the clear width of the opening in the bottom plate is above the external diameter of the stop.

The invention also envisages that between the underside of the template and the top side of the stop a sleeve surrounding the guiding pin is provided, and the clear width of the opening through the upper plate exceeds the outer diameter of the sleeve.

When tilting out the individual carriers, the template can definitely be raised through a few millimeters. This considerably facilitates the tilt-out procedure.

According to a variant of the invention, the guide pin is a screw firmly attached to the template.

However, the common height defined by the individual carriers is not equally well suitable for all coating materials. For example, when coating form parts, quite commonly materials are used which require a smaller than customary separation with respect to the floor already at the beginning of the pressing process, because the resulting pressure would otherwise be too high, entailing a danger of tearing the material. Under such boundary conditions, according to this invention, the effective height of the individual carriers is shortened by interposing an intermediate plate above the template. For this purpose it neither necessary to modify nor to replace the individual carriers themselves. The intermediate plate too has breakouts corresponding to those of the template and defining the movement ranges of the individual carriers. This does not restrict the ranges of movement. But such restriction is possible, if desired, depending on the workpieces or film material.

According to a further design variant of this invention, a preferably elastic filler covering is provided over the template. The surface of this covering is flush with the covering layer of each individual carrier. Any thermally stable material can be used for this filler covering. Cellular rubber or Bulpren are particularly suitable.

The purpose of using such an elastic filler covering is the desired application of greater working pressure which can be combined with stronger pre-heating, giving in turn a higher edge temperature of the produced workpieces. An advantage is that such a coated form board can be exposed to these higher temperatures without separation of the film from the form part, giving a higher quality final product.

After the vacuum drawing step the pressing process interposes a time delay before applying pressure as the next step, to avoid bursting of the film resting on the individual carriers. This time delay can be shortened when using the elastic filler covering which also stabilizes the system and prevents slipping of the workpieces.

To permit restriction of movement of the individual carriers in this variant too, the filler covering is provided with breakouts corresponding to the breakouts of the template, to define the range of movement of the individual carriers.

To improve and speed-up adjustment of the projection of the workpieces, a further extension of this invention envisages marker lines on the surface of the filler covering connecting the outer edges of adjacent breakouts in a row.

Another extension of this invention proposes that plug-on parts should be provided for the individual carriers. This is of great importance in particular for film coating extremely narrow parts which do not permit resting of the workpieces even in minimum setting of the individual carriers. An example of this is film coating of frames. This is a possibility for enlarging the contact bearing surface for such workpieces.

Thereby this invention envisages that a plug-on part encompasses the entire individual carrier and that it is flush with the covering layer on its top side. In order not to impair the elastic effect of the springs carrying the individual carriers, it is envisaged that the upper region of the of the plug-on part has an elastic section which is thicker than the elastic covering layer of the individual carrier. Furthermore, the material of the elastic section is more elastic than the elastic covering layer. This ensures that when vacuum is applied, the elastic section is compressed relatively quickly to the level of the elastic covering layer, beyond which state the spring again acts according to its intended purpose in this invention.

According to a further extension of this invention, it is also envisaged that between adjacent breakouts in the template, further breakouts are provided for regulating the film tension stress. In particular this is intended to prevent wrinkles appearing in the film stretched over the workpieces. This problem arises in particular when the occupation of the press table is rather uneven. The shape of these breakouts is not restricted.

To counteract the enormous tensional stress in the corner regions of the press table, a variant of this invention envisages placement of form pieces in these corner regions. In particular, it is of advantage to give these form pieces triangular cross-section. This reduces the edge effect and thus the tensional stress in this region. Too great pressure in these regions can lead to bursting or discoloration of the film, whereby the discoloration can persist to the next nearest workpiece which therefore becomes a reject item.

Ideally each form piece should be provided with a milled cut on its side facing away from the corners of the press table, to create a gentle transition which further reduces the tensional stress forces.

This invention also includes a process for multi-side film coating of form boards in a press table insert placed in the press table, according to one or several of the features described above, whereby the film located above the form plates resting on the press table is first heated in a heating chamber, and then coated onto the workpiece by applying vacuum and pressure.

The process according to this invention is intended to make possible quicker and more efficient working than the known process is capable of.

This invention solves the task by placing the workpieces, which are to be coated, on the individual carriers with mutual separation, whereby the individual carriers located in the peripheral regions of the workpieces are shifted within their range of movement, such that the relevant individual carriers are slightly set back with respect to the edges of the workpiece, and that after running the press table into the pressing chamber, the distance between the workpieces and the press table support is slightly reduced for the vacuum drawing period.

After sufficient space was available for film coating the edges of the form boards during the vacuum drawing period, thereafter by reducing the separation the space is made so small that the film cannot any longer tear-off or burst when applying the pressure.

A further advantage is achieved by interposing a time delay between the completed vacuum drawing stage and the subsequent application of pressure.

This process step too assists stabilization of the film coating process. Film areas which do not rest on workpieces, but instead on the individual carriers, generally tend to tear if pressure is applied too rapidly. The interposed time delay considerably reduces this tendency.

According to a further extension of this invention, it is also envisaged that for large empty areas between mounted workpieces, form pieces are placed in these empty regions to enhance the film tensioning behavior. Usually adhesive is applied to the sides of the workpieces which are to be film coated, before placing the workpieces onto the press table, and the adhesive is first allowed to dry slightly. This step can be omitted if self-adhesive films are used. However, in this case all individual carriers as well as the press table are treated with a separating agent so that the film can be pulled off again after pressing process.

BRIEF DESCRIPTION OF THE DRAWINGS

This invention in all its variants will now be described in more detail, with reference to drawings which show the following features.

DESCRIPTION OF THE PREFERRED EMBODIMENTS AND BEST MODE

Figure 1:
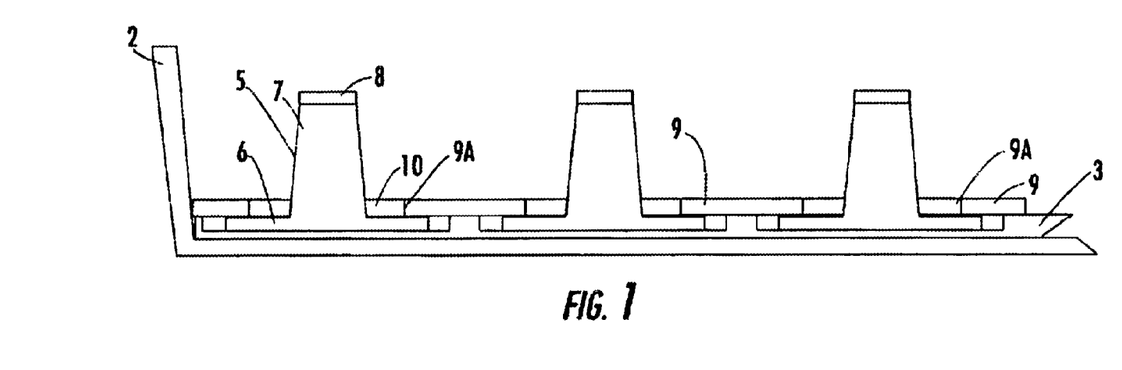
FIG. 1 A side view of a first design variant of the press table insert according to this invention, in cross section.

FIG. 1 shows a press table insert located in a trough 2 of the press table 1, in particular the devices for taking up the form board, whereby the latter are not shown. Directly above the floor surface of the trough 2 there is a guiding plate 3 which has numerous guides 4 for taking up and guiding the individual carriers 5. Each one of the individual carriers 5 consists of a base 6, which is located movable in the guides 4, and a shaft 7 which connects to an elastic covering layer 8. The base 6 and the shaft 7 are made of rigid materials such as metal or plastic, but the covering layer 8 is made of an elastic non-slip material which can withstand regular cyclic stress while pressing, for many cycles without suffering damage. Furthermore, this elastic covering layer makes possible a reduction of the relative shaft height when pressing. This feature reduces the distance between the form plate, which is resting on the covering layers 8 of many individual carriers 5, with respect to the guiding plate 3 during the vacuum drawing process such that when applying pressure thereafter as the next process step, the distance has already reduced to such an extent that destruction of the film by excessive pressure is avoided. The shaft 7 broadens towards the base 6 to make possible easy detachment of the film. Over the guiding plate 3 a template 9 with breakouts 9A is provided. The shafts 7 of the individual carriers 5 project upwards through these breakouts. Thereby the breakouts 9A constitute ranges of movement 10 within which the individual carriers 5 can be displaced. Furthermore, the template 9 partly covers the guides 4 and thereby constitutes a part of the base guiding, by preventing tilt-out of the bases 6 in this design variant. Each base 6 can be moved through the entire range of movement 10 within the breakouts 9A. The base 6, usually made with rectangular base area, can also be made with rounded corners or completely round, for better and complete mobility in its guide 4. This form is of particular advantage when the base can be rotated, in order to be able, in spite of this setting, to fully exploit the corner regions of the range of movement 10. This makes possible linear shift as well as rotation of the individual carrier 5 in the guides 4 over the entire range of movement 10.

A rotationally symmetrical design of the individual carrier 5 is possible too. The individual carriers 5 can be positioned in the guiding plate 3 with any required separation, depending on the nature of the workpieces to be processed. The guiding plate 3 is prepared accordingly. For producing chiefly rectangular form boards, a variant with equally spaced guides 4 is preferred. This defines a maximum/minimum separation of the individual carriers 5.

Figure 2:
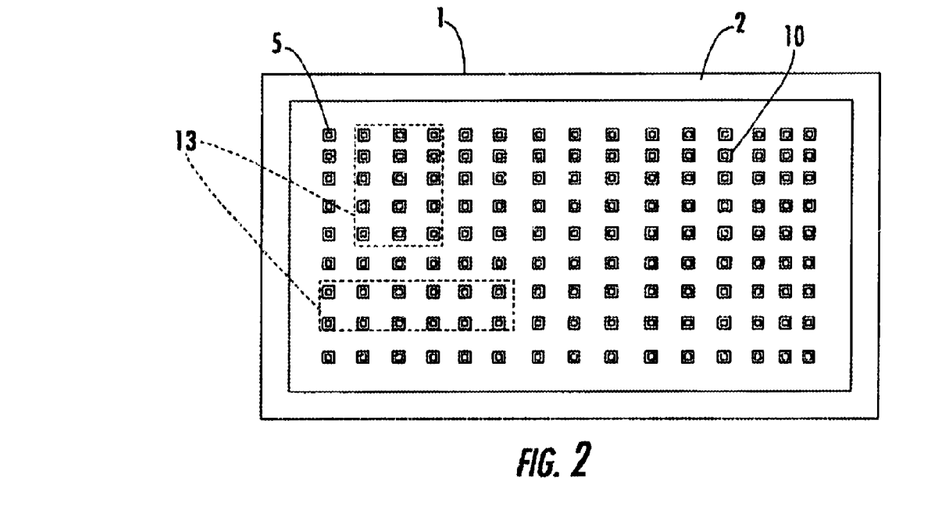
FIG. 2 A top view of an occupied press table in part depiction.

A workpiece 13 placed onto the individual carriers 5 is shown in shaded depiction in FIG. 2.

Figure 3:
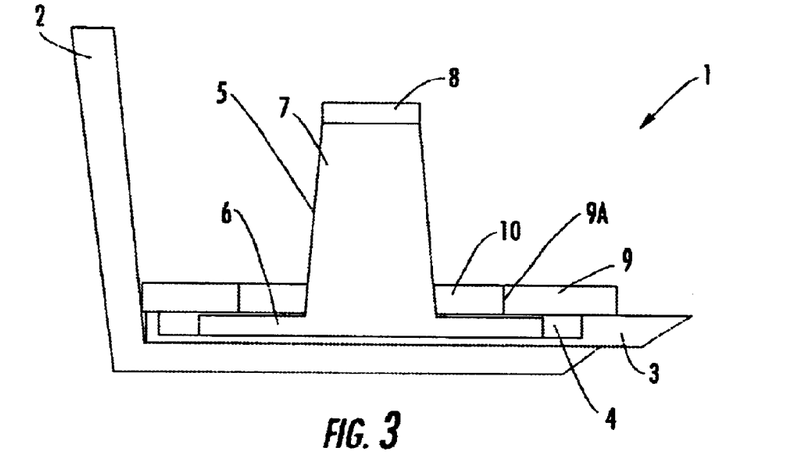
FIG. 3 A detailed depiction of an individual carrier positioned on the press table.

FIG. 3 shows a detailed depiction of the individual carrier 5 guided in the guiding plate 3. This variant also uses the template 9 whose constructional height defines the effective base height of the individual carrier 5.

Figure 4:
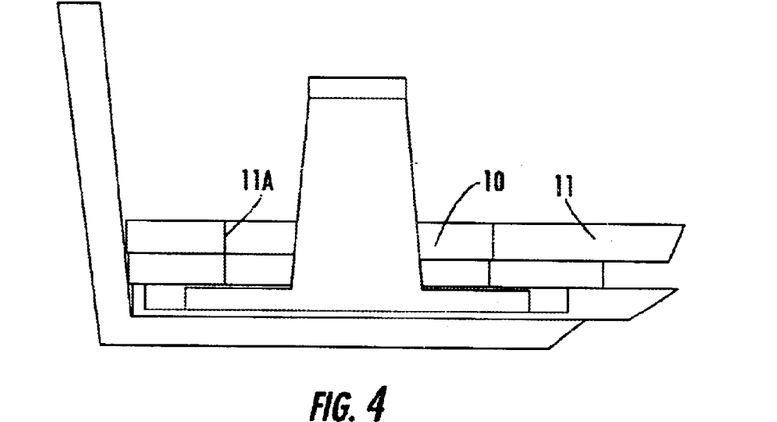
FIG. 4 An extension of the variant according to FIG. 1 in detail.

Depending on the material characteristics of the coating film, it may be necessary to shorten the effective base height of the individual carriers 5. For this purpose, as shown in FIG. 4, an intermediate plate 11 is located above the template 9. This intermediate plate 11 too has breakouts 11A which correspond to the breakouts 9A of the template 9 and thus again define ranges of movement 10.

Figure 5:
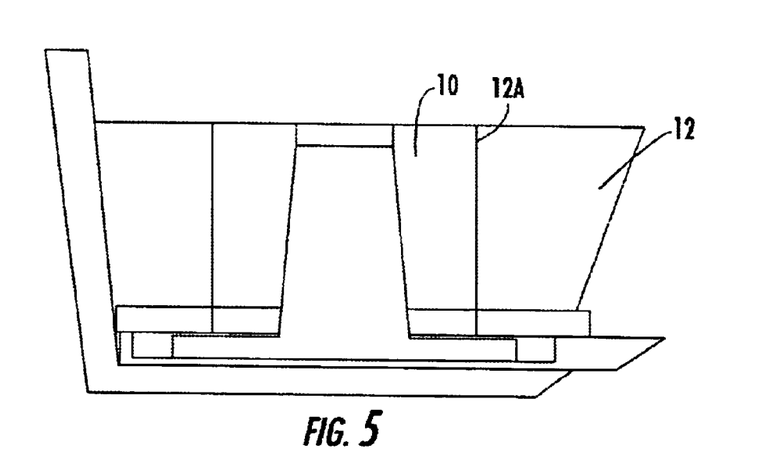
FIG. 5 Another extension of the variant according to FIG. 1 in detail.

For further reduction of the base height, a filler covering 12 is provided over the template 9. The surface of the filler covering is flush with the covering layer 8 of the individual carriers 5, forming a single plane. Provision of this filler covering 12 makes possible faster production—because the individual carriers 5 do not need to be set up—and, in particular, it achieves higher edge temperature. The filler covering 12 too defines the ranges of movement 10 for the individual carriers 5. The breakouts 12A are provided for this purpose. This variant is shown in FIG. 5.

Figure 8:
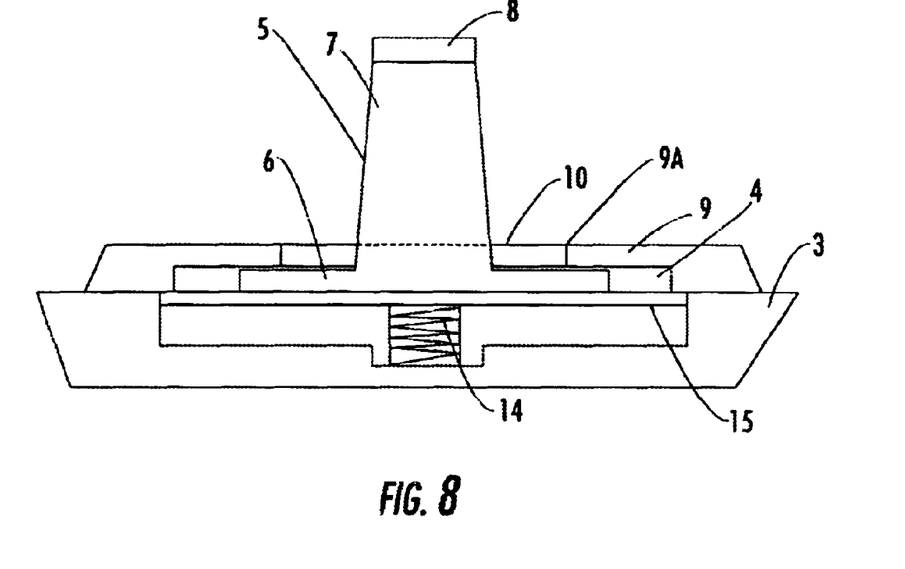
FIG. 8 A detailed side view of a second design variant of a press table insert in cross section.

A variant is not depicted in which the filler covering 12 has marking lines along the outer edges of adjacent breakouts 12A. According to a second variant of the press table insert depicted in FIG. 8, the base 6 rests on a spring 14 supported by a spring plate 15. The spring 14 as well as the spring plate 15 arc thereby taken up by the guides 4 of the guiding plate 3 and held by the underside of the template 9. The spring-loaded positioning of the individual carriers 5 brings advantages during pressing as well as making it easy to take the individual carriers 5 out of the guides 4 by tilting. Not depicted but preferred for implementation is a variant in which the spring plate 15 rests on four springs located in its peripheral regions.

Figure 9:
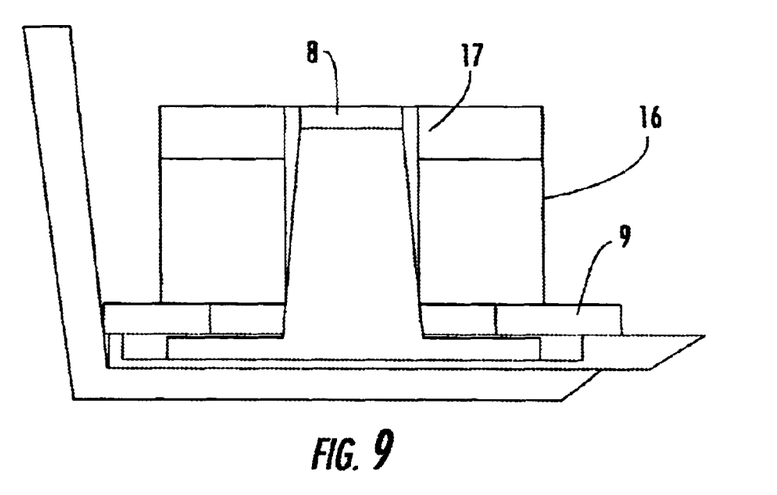
FIG. 9 A section through the arrangement of an individual carrier with plug-on part.

For processing very narrow workpieces 13, plug-on parts 16 are envisaged which can be pushed over the shaft 7 of the individual carriers 5. This produces a broadened supporting area. The plug-on parts 16 end flush with the elastic covering layer 8 of the shaft 7 with which they for a common plane. Each plug-on part 16 has an elastic section 17 in its upper region. This elastic section 17 is thicker than the elastic covering layer 8, to ensure response of the spring 14 too during the vacuum drawing stage. For this purpose the material of the elastic section 17 is more elastic than the material of the elastic covering layer 8.

Usually the guiding plate 3, the template 9 and the spring plate 15 are all made of porous material. Alternatively they can be made of plastic, stainless steel or aluminum when greater strength is needed, in which case they must be perforated with numerous holes (not depicted) to permit penetration of the vacuum during the vacuum drawing process stage.

The press table can take up numerous differently shaped workpieces 13 in a single work cycle. The individual carriers 5 are thereby moved within their range of movement 10 in the peripheral regions of the workpieces 13 such that a suitable protrusion is obtained for the film coating process. The achievable minimum separations between adjacent individual carriers 5 together with the predefined ranges of movement 10, permit processing of workpieces with almost unlimited dimensions. Further breakouts of any shape (not depicted) can be provided between the breakouts 9A of the template 9, in particular for better regulation of the tensional forces which arise.

Figure 10:
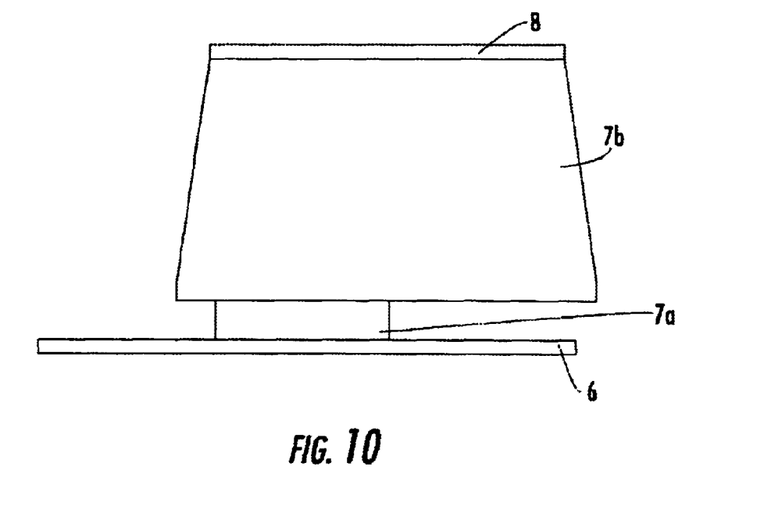
FIG. 10 An individual carrier with shaft subdivided into two parts.

FIG. 10 shows an advantageous variant of the individual carriers 5. In this variant the shaft is subdivided into a bottom part 7a and a top part 7b. The two parts 7a, 7b do not have a common axis, so that the upper part 7b protrudes asymmetrically over the bottom part 7a. This design gives an even greater range of possible movement of the individual carriers when adjusting them. Furthermore, the subdivision makes possible larger dimensions of the top section 7b, so that the individual carriers 5 can be loaded better.

The shaft 7a, 7b and the base 6 are preferentially made of aluminum. The top part 7b is tapered towards the top, to make it easier to pull off the film after the pressing process.

The bottom part 7a, which is cylindrical in this variant, can equally well have the form of a conical frustrum or any other suitable form.

Figure 11:
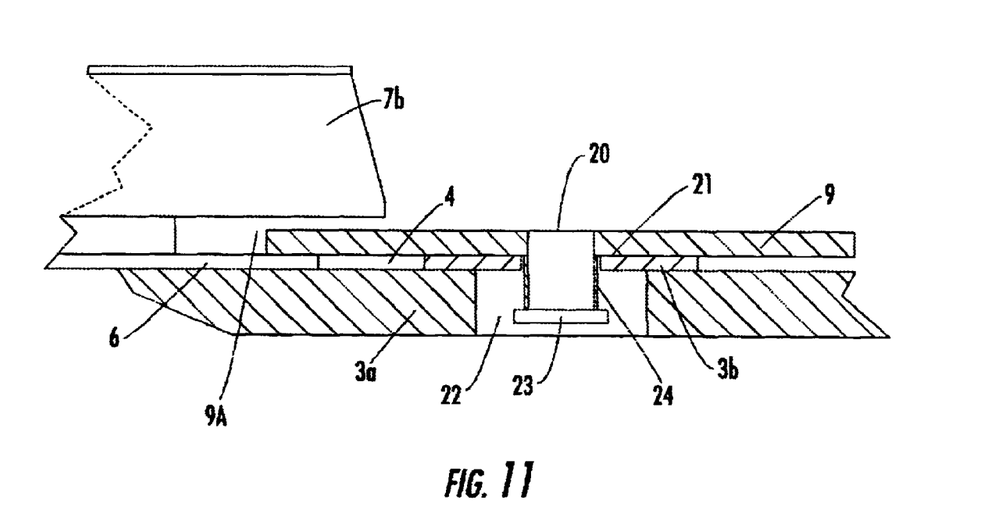
FIG. 11 A cross section depiction of a further design variant of the press table insert according to this invention and FIG. 12 A cross section through a further variant of the press table insert according to this invention.

FIG. 11 shows an individual carrier 5 according to FIG. 10 in combination with a further variant of the press table insert.

Thereby the guiding plate if constructed in two layers and consists of a bottom plate 3a and a top plate 3b. These two plates are bonded together. The template 9 is located above the two-layer guiding plate. This constitutes the guides 4 which take up the base 6 of the individual carrier 5.

To facilitate take out of the individual carrier 5, a construction is envisaged which makes possible simple and safe lifting of the template through a few millimeters.

For this purpose the template 9 is provided with several guide pins 20 which point downwards and are firmly attached to the template 9. In the variant actually depicted, the guide pin 20 is implemented as a screw. The guide pin 20 passes through the upper plate 3a which is provided with an opening 21 for this purpose. At its bottom end the guide pin 20 is provided with a stop 23. The guide pin 20 is surrounded by a sleeve 24 between the stop 23 and the underside of the template 9. To enable the vertical movement, the bottom plate 3a is provided with an opening 22 which takes up the guide pin 20, the stop 23 and the sleeve 24. The opening 22 is simply a hole through the entire bottom plate 3a.

When unlatching the individual carrier 5 from its holder, the template 9 can now be lifted through the distance between the stop and the underside of the upper plate 3b. In this variant the bottom guide 3a is made of wood and the top guide 3b is made of stainless steel.

For a supported area of 100×140, preferably ten guide pins 20 are used.

To define the ranges of movement 10 for the individual carriers it is not essentially necessary to use a template 9 with breakouts 9A.

Figure 12:
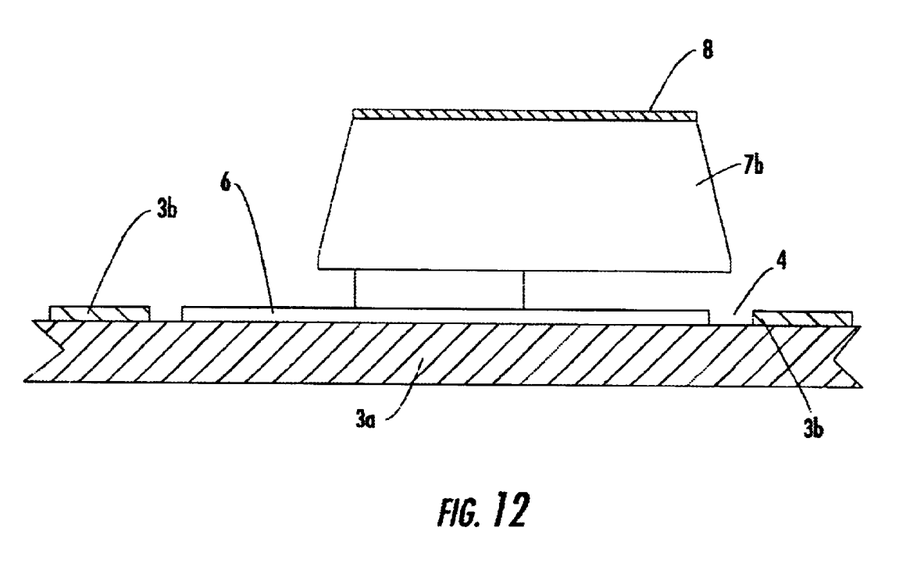

The press table insert can also be designed as shown in FIG. 12. Here too, the two-section design of the guiding plate introduced in FIG. 11 is used again. The bottom plate 3a and the base of the individual carrier are made of magnetizable material. The guides 4 provided by the upper plate 3b constitute the defines ranges of movement 10.

The upper plate 3b and the lower plate 3a are bonded together.

Figure 6:
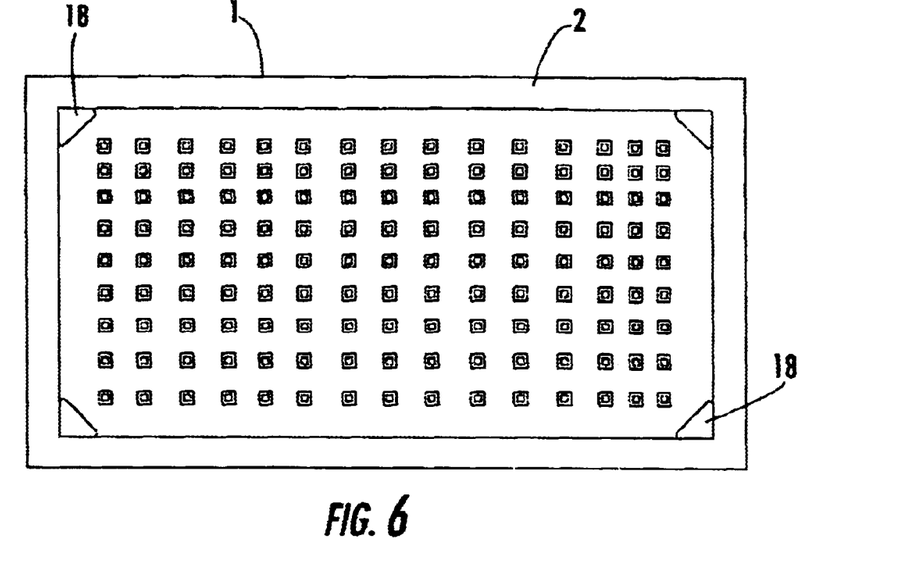
FIG. 6 A top view onto a press table with inserted form pieces as schematic depiction.

Furthermore, to prevent tearing or discoloration of the film in the corner regions of the press table 1 by excessive tensional stress, these areas are mitigated by inserting form pieces 18. The corresponding arrangement is shown in FIG. 6.

Figure 7:
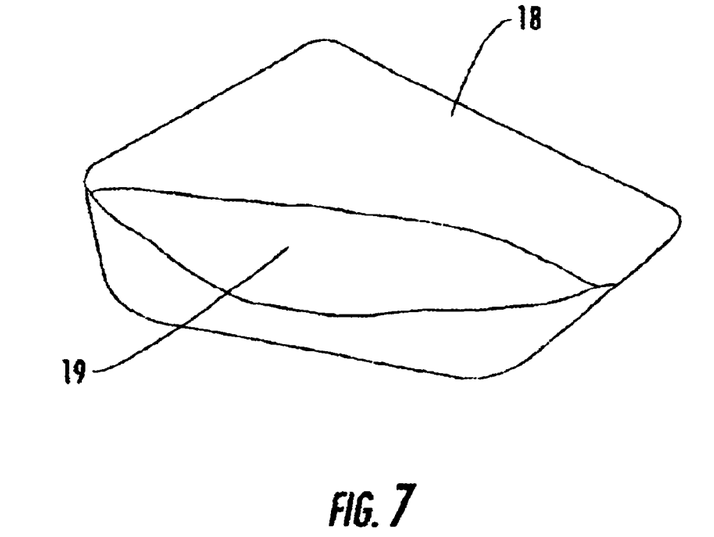
FIG. 7 A detailed depiction of a form piece according to FIG. 6.

FIG. 7 shows the aforementioned form pieces 18 which essentially consist of triangular bodies with rounded outer edges. Still better reduction of tensional forces in these problem zones can be achieved by providing the form pieces ideally with one or several milled cut outs 19 on their surface region facing towards the interior of the press table 1.

I claim:

1. Press table insert for a coating press for multi-side film coating of form boards with a press table (1) which can be moved into the coating press, equipped with numerous individual carriers (5) for taking up the workpieces (13) which are to be coated, characterized by the feature that each individual carrier (5), for taking up the workpieces (13), is mounted such that it is movable horizontally and guided within a predetermined range (10) on the press table (1), and such that the height of each individual carrier (5) is shortened by means of the pressing process.

2. Press table insert according to claim 1, characterized by the feature that the predetermined range of movement (10) around each individual carrier (5) can have any desired shape.

3. Press table insert according to claim 1, characterized by the feature that the range of movement (10) around each individual carrier (5) has the same size.

4. Press table insert according to claim 1, characterized by the feature that the separations of mutually adjacent ranges of movement (10) are equal.

5. Coating press according to claim 1, characterized by the feature that a minimum separation between adjacent ranges of movement (10) is envisaged.

6. Press table insert for a coating press for multi-side film coating of form boards with a press table (1) which can be moved into the coating press, equipped with numerous individual carriers (5) for taking up the workpieces (13) which are to be coated, characterized by the feature that each individual carrier (5), for taking up the workpieces (13), is mounted such that it is movable horizontally through a certain range (10) on the press table (1), and such that the height of each individual carrier (5) is shortened during the pressing process, and each individual carrier (5) has identical height and consists of a base (6), a shaft (7) and a covering layer (8) resting on the shaft (7), whereby the shaft (7) and the base (6) are made of rigid material and the covering layer (8) is made of elastic material, and the shaft (7) is subdivided into a bottom part (7a) connected to the base (6) for guiding in the range of movement (10), and a top part (7b) taking up the covering layer (8).

7. Press table insert according to claim 6, characterized by the feature that the upper part (7b) and the lower part (7c) are mutually offset and have no common vertical axis.

8. Press table insert according to claim 7, characterized by the feature that the base (6) and the bottom part (7a) and the top part (7b) and the covering layer (8) have a common vertical axis for each carrier.

9. Press table insert according to claim 7, characterized by the feature that the upper part (7b) carrying the covering layer (8) at least partially protrudes horizontally beyond the bottom part (7a) in the transition region between the two parts.

10. Press table insert according to claim 6, characterized by the feature that a guiding plate (3) is equipped with numerous guides (4) which take up the bases (6) of the individual carriers (5).

11. Press table insert according to claim 10, characterized by the feature that the guides (4) define the ranges of movement (10).

12. Press table insert according to claim 1, characterized by the feature that a template (9) with breakouts (9A) is provided above the guiding plate (3), whereby the breakouts (9A) define the ranges of movement (10) of the individual carriers.

13. Press table insert according to claim 12, characterized by the feature that the base (6) of the individual carrier (5) is spring-mounted in the guide (4).

14. Coating press according to claim 13, characterized by the feature that in the guide (4) a combination consisting of a spring (14) and a spring plate (15) is provided for taking up the base (6).

15. Press table insert according to claim 14, characterized by the feature that the spring (14) under the spring plate (15) is positioned centrally.

16. Press table insert according to claim 13, characterized by the feature that several springs in the corner regions of the spring plate (15) are provided.

17. Press table insert according to claim 12, characterized by the feature that the contact bearing area assigned to the base (6) in the guides (4) are of the same size or larger than the range of movement (10) assigned to the individual carrier (5).

18. Press table insert according to claim 15, characterized by the feature that the contact bearing area of the base (6) is rectangular, with rounded corners, or completely round.

19. Press table insert according to claim 10, characterized by the feature that the base (6) and the guiding plate (3) are made of magnetizable material, and that the base (6) id held magnetically in the guide (4).

20. Press table insert according to claim 12, characterized by the feature that the guiding plate (3) as well as the template (9) are made of porous material.

21. Press table insert according to claim 12, characterized by the feature that the guiding plate (3) as well as the template (9) are made of high strength materials selected from the group consisting of aluminum, stainless steel and plastic, and are perforated with numerous holes for vacuum penetration.

22. Press table insert for a coating press for multi-side film coating of form boards with a press table (1) which can be moved into the coating press, equipped with numerous individual carriers (5) for taking up the workpieces (13) which are to be coated, characterized by the feature that each individual carrier (5), for taking up the workpieces (13), is mounted such that it is movable horizontally through a certain range (10) on the press table (1), and such that the height of each individual carrier (5) is shortened during the pressing process, and each individual carrier (5) has identical height and consists of a base (6), a shaft (7) and a covering layer (8) resting on the shaft (7), whereby the shaft (7) and the base (6) are made of rigid material and the covering layer (8) is made of elastic material, and the shaft (7) broadens from the covering layer (8) towards the base (6) and has the form of a pyramidal or conical frustrum.

23. Press table insert according to claim 6, characterized by the feature that the upper part (7a) of the shaft (7) tapers towards the top and has the form of a pyramidal or conical frustrum.

24. Press table insert according to claim 6, characterized by the feature that the bottom part (7a) of the shaft (7) is cylindrical.

25. Press table insert according to claim 6, characterized by the feature that the bottom part (7a) essentially corresponds to the height of the template (9) and projects only slightly above the latter.

26. Press table insert for a coating press for multi-side film coating of form boards with a press table (1) which can be moved into the coating press, equipped with numerous individual carriers (5) for taking up the workpieces (13) which are to be coated, characterized by the feature that each individual carrier (5), for taking up the workpieces (13), is mounted such that it is movable horizontally through a certain range (10) on the press table (1), and such that the height of each individual carrier (5) is shortened during the pressing process, and each individual carrier (5) has identical height and consists of a base (6), a shaft(7) and a covering layer (8) resting on the shaft (7), whereby the shaft (7) and the base (6) are made of rigid material and the covering layer (8) is made of elastic material, and the covering layer (8) has an adhering surface.

27. Press table insert for a coating press for multi-side film coating of form boards with a press table (1) which can be moved into the coating press, equipped with numerous individual carriers (5) for taking up the workpieces (13) which are to be coated, characterized by the feature that each individual carrier (5), for taking up the workpieces (13), is mounted such that it is movable horizontally through a certain range (10) on the press table (1), and such that the height of each individual carrier (5) is shortened during the pressing process, and each individual carrier (5) has identical height and consists of a base (6), a shaft (7) and a covering layer (8) resting on the shaft (7), whereby the shaft (7) and the base (6) are made of rigid material and the covering layer (8) is made of elastic material, and each individual carrier is made of a material selected from the group consisting of polyamide and cellulose amide.

28. Press table insert according to claim 12, characterized by the feature that above the template (9) an intermediate plate (11) is provided to shorten the effective height of the individual carrier (5).

29. Press table insert according to claim 12, characterized by the feature that an elastic filler covering (12), the surface of which is flush with the covering layer (8) of each individual carrier, is provided above the template (9).

30. Press table insert according to claim 28, characterized by the feature that the intermediate plate (11) as well as the filler covering (12) have breakouts (11A, 12A) corresponding to the breakouts (9A) of the template (9) and defining the ranges of movement (10) of the individual carriers (5).

31. Press table insert according to claim 30, characterized by the feature that marker lines are provided on the surface of the filler covering connecting the outer edges of adjacent breakouts (12A) in a row.

32. Press table insert for a coating press for multi-side film coating of form boards with a press table (1) which can be moved into the coating press, equipped with numerous individual carriers (5) for taking up the workpieces (13) which are to be coated, characterized by the feature that each individual carrier (5), for taking up the workpieces (13), is mounted such that it is movable horizontally through a certain range (10) on the press table (1), and such that the height of each individual carrier (5) is shortened during the pressing process, and plug-on parts (16) are provided for the individual carriers (5).

33. Press table insert according to claim 32, characterized by the feature that a plug-on part (16) completely surrounds the entire individual carrier (5) and that it terminates at the top flush with the covering layer.

34. Press table insert according to claim 33, characterized by the feature that the plug-on part (16) has an elastic section (17) in its upper region.

35. Press table insert according to claim 34, characterized by the feature that the elastic section (17) is thicker than the elastic covering layer (8).

36. Press table insert according to claim 35, characterized by the feature that the material of the elastic section (17) is more elastic than the material of the elastic covering layer (8).

37. Press table insert according to claim 12, characterized by the feature that between adjacent breakouts (9A) of the template (9), further breakouts are provided for regulating the tensional stress forces.

38. Press table insert for a coating press for multi-side film coating of form boards with a press table (1) which can be moved into the coating press, equipped with numerous individual carriers (5) for taking up the workpieces (13) which are to be coated, characterized by the feature that each individual carrier (5), for taking up the workpieces (13), is mounted such that it is movable horizontally through a certain range (10) on the press table (1), and such that the height of each individual carrier (5) is shortened during the pressing process, and in corner regions of the press table (1), form parts (18) are provided with essentially triangular cross section to reduce tensional stress forces.

39. Press table insert according to claim 38, characterized by the feature that each form part (18) has at least one milled cut (19) on the side facing away from the corners of the press table (1).

40. Press table insert according to claim 10, characterized by the feature that the guiding plate (3) consists of two layers, comprising a bottom plate (3a) and a top plate (3b), whereby the guides (4) are constituted by the top plate (3b).

41. Press table insert according to claim 40, characterized by the feature that the top plate (3b) is firmly attached to the bottom plate (3a).

42. Press table insert according to claim 12, characterized by the feature that the template (9) is provided with guide pins (20) which pass through the upper and lower plates (3a,3b).

43. Press table insert according to claim 42, characterized by the feature that the guide pins (20) pass through the upper plate (3b) in regions (4a) between the breakouts forming the guides (4), and that for taking up the guide pins (20), breakouts (21,22) are provided in the upper and lower plates (3a,3b) with clear widths above the outer diameter of the guide pins (20).

44. Press table insert according to claim 42, characterized by the feature that each guide pin (20) is equipped with a stop (23) at its bottom end located in the region of the bottom plate (3a).

45. Press table insert according to claim 44, characterized by the feature that the clear width of the opening (22) of the bottom plate (3a) is above the outer diameter of the stop (23).

46. Press table insert according to claim 43, characterized by the feature that between the underside of the template (9) and the top side of the stop (23) a sleeve (24) is provided surrounding the guide pin (20), and that the clear width op the opening (21) through the upper plate (3b) lies over the outer diameter of the sleeve (24).

47. Press table insert according to claim 42, characterized by the feature that the guide pin (20) is a screw firmly attached to the template (9).

48. Press table insert according to claim 40, characterized by the feature that the bottom plate (3a) is made of wood and the top plate (3b) is made of stainless steel.

* * * * *